Sept. 8, 1953 R. J. CHONOSKI ET AL 2,651,543
INSIDE REFLECTION VISOR FOR AUTOMOBILES
Filed July 26, 1950 2 Sheets-Sheet 1
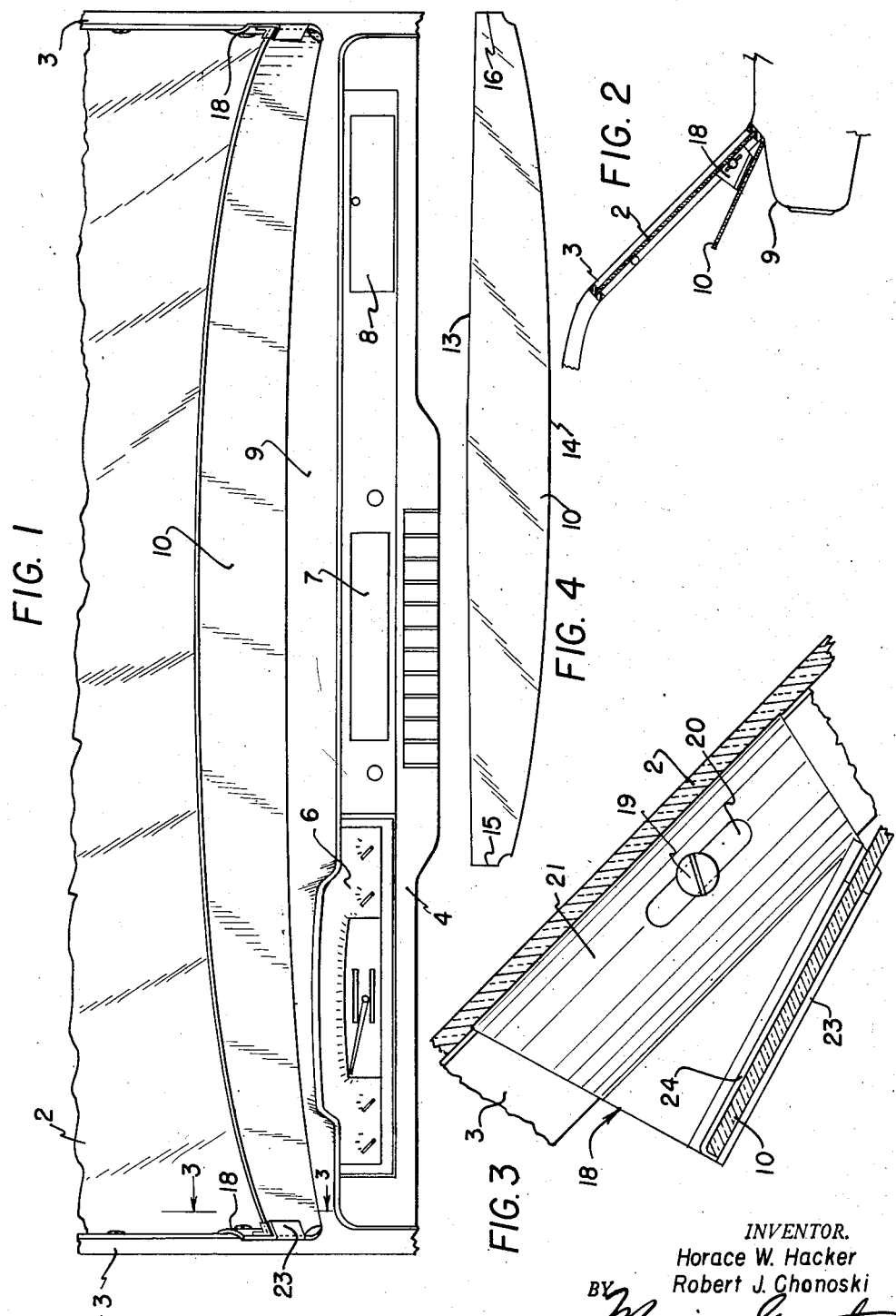
INVENTOR.
Horace W. Hacker
Robert J. Chonoski
BY Morris Spector,
Attys.

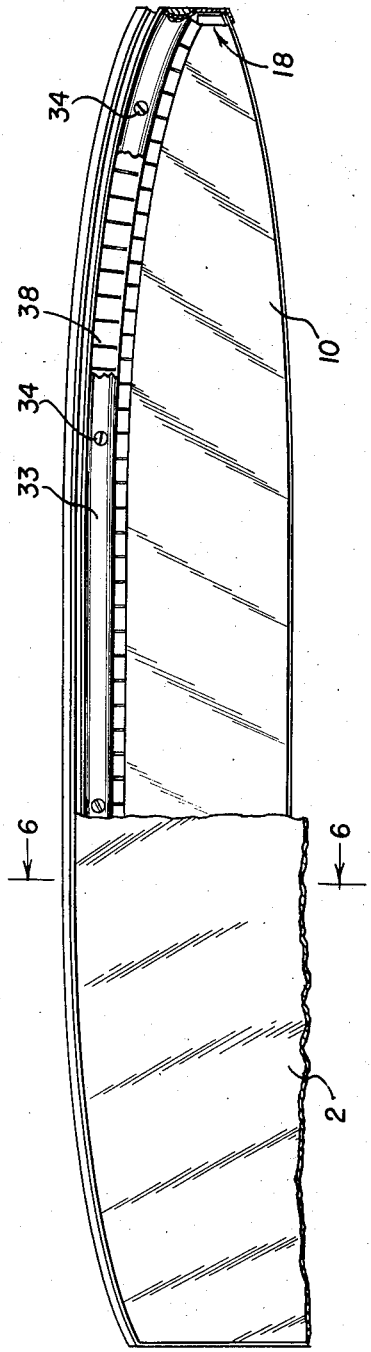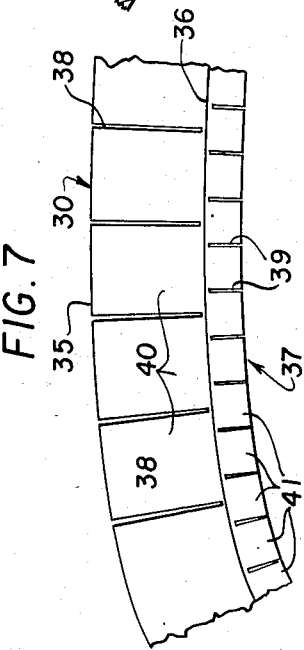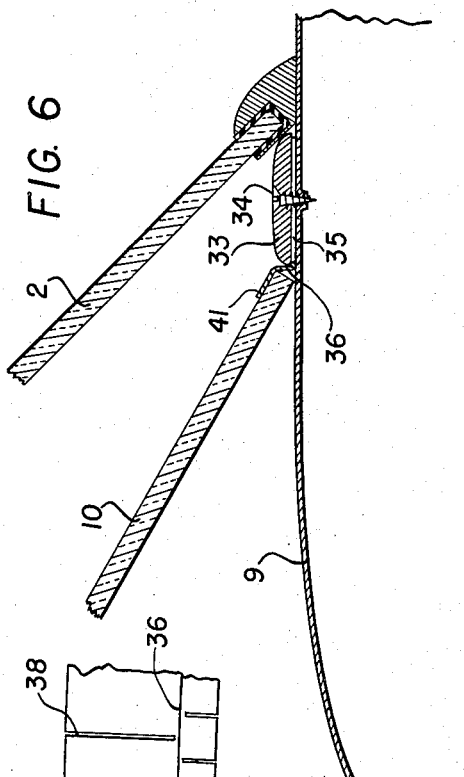

Patented Sept. 8, 1953

2,651,543

UNITED STATES PATENT OFFICE 2,651,543

INSIDE REFLECTION VISOR FOR AUTOMOBILES

Robert J. Chonoski and Horace W. Hacker, La Grange, Ill.; said Chonoski assignor to said Hacker Application July 26, 1950, Serial No. 175,938

5 Claims. (Cl. 296—97)

1

This invention relates to a sun shield for shielding the eyes of a motorist against reflected light from an instrument panel of an automobile and from chromium plated and other shiny parts at the front of the automobile and in the normal range of vision of the motorist.

It frequently happens, in daytime driving, that sunlight strikes the top of the instrument panel of an automobile and the parts immediately above the instrument panel and is thence reflected to the eyes of the driver where it produces objectionable glare. It is one of the objects of the present invention to provide a shield which can be mounted inside of the automobile in a position to prevent these reflection glares, yet in no way obscure driving vision or vision of the instrument panel. In accordance with the preferred embodiment of the present invention there is provided a visor which is mounted inside of the automobile and projects upwardly from the base of the windshield at a sufficient angle from the windshield to avoid obstructing of a driving vision and yet which will prevent the glare-producing sun's rays from striking the instrument panel or the parts immediately thereabove. It is a further object of the present invention to provide an inside reflecting visor whose top surface is dulled so as to reduce light reflection therefrom.

It is a still further object of the present invention to provide a reflector visor of springy, flexible material which may be cut from flat sheets and in such patterns that it can be sprung into position with its lower edge at substantially the line where the windshield glass meets the molding or along the windshield inner garnish molding and, due to the flexibility of the material, it will take the required shape and project inwardly and upwardly from its base to shield the eyes of the driver from glare reflections, yet in no way obscure his driving vision nor obscure the instrument panel.

The attainment of the above and further objects of the present invention will be apparent from the following specifications taken in conjunction with the accompanying drawing forming a part thereof.

In the drawing:

Figure 1 is a front view of a shield of the present invention installed in an automobile;

Figure 2 is a transverse sectional view of the shield in place;

Figure 3 is an enlarged view of the left bracket taken along the line 3—3 of Figure 1;

Figure 4 is a plan view of the flat sheet from which the shield is made;

2

Figure 5 is a top view partially broken away illustrating a modified construction;

Figure 6 is a sectional view taken along the line 6—6 of Figure 5 and looking in the direction of the arrows;

Figure 7 is a plan view of a portion of one of the strips used in the embodiment of Figure 5.

Reference may now be had more particularly to the drawing wherein like reference numerals designate like parts throughout.

In Figure 1 there is shown a view of the interior of a passenger automobile as seen by the driver of the automobile. This includes a conventional windshield 2 that extends from uprights 3—3 at opposite front sides of the automobile. A panel 4 extends across the front of the automobile and into the automobile rearwardly from the base of the windshield and forms a housing for an instrument panel 6, a radio receiver set 7, and a glove compartment 8. The housing includes a top portion 9 that projects inwardly of the automobile, as is conventional.

In the conventional automobile it frequently happens that the sun's rays enter through the windshield 2 and strike the top portion 9 at such an angle that light is reflected therefrom to the eyes of the driver and thus produces a very objectionable glare. To prevent this glare there is provided, in accordance with the present invention, a shield or inside reflecting visor 10 which is mounted in position to overlie the top 9 and shield it from the sun's rays while at the same time neither obstructing driving vision nor the view of the instrument panel. The shield 10 is made of any suitable flexible or springy material such as, for instance, a sheet of plastic, which may if desired be colored. It may be made opaque but is preferably translucent but not transparent. The plastic is of the type that will not be too adversely affected by the sun's rays or the heat produced thereby. It may be a tempered plastic. The transluscency may be obtained by making one of the two opposite flat surfaces of the sheet 10 of frosted or sanded appearance. The sheet includes a straight upper edge 13, a lower edge 14 that is curved to cause it to fit in place, and two transverse edges 15—16.

In order to hold the shield or inside reflecting visor in place two similar "right" and "left" metal brackets 18—18 are mounted on the uprights 3—3, respectively, each as by a screw 19 which passes through an elongated slot 20 in a side wall 21 of the bracket so as to permit vertical adjustment of the bracket. The screw 19 is one of the screws that holds the vertical portion of the windshield inner or garnish molding in place. The side wall 21 of the bracket includes a bent over lip 23 which, together with an angle 24 welded to the side wall 21 forms a channel for receiving the edge 15 (or 16) of the reflecting visor. The edge 14 of the visor rests on the top 9. If desired a piece of felt or sponge rubber may be inserted between each bracket and the edge of the visor to take up minor differences in length of the shield 10 compared to the required length, and for anti-rattling purposes. The shield 10 is accurately cut to size and is held in position by the two brackets so that the springiness of the material 10 acting under its own resiliency urges the opposite ends 15—16 firmly into the brackets, thus holding the inside reflecting visor in place.

It is to be noted that the inside reflecting visor which extends from the base of the windshield inwardly in the automobile effectively shields the top of the shelf 9 from the sun's rays and protects the driver's eyes from light that may be reflected from surfaces at the front of the automobile such as for instance the base of the windshield wiper and the front hood ornament, yet it in no way obstructs vision of the instrument panel, radio, or access to the glove compartment, nor does it interfere with the driver's vision through the windshield.

Reference may now be had to Figures 5, 6, and 7 which illustrate a modified construction. The essential part of this construction lies in the provision of means cooperating with the bottom of the inside reflecting visor for excluding light at the lower edge thereof and holding said lower edge firmly in place. In this embodiment inside reflecting visor 10 is constructed and held in place between a pair of end brackets substantially as in the embodiment previously described. In addition there is provided a continuous strip of metal 30 which is laid upon the top or shelf 9 instrument panel of the automobile and is secured in place in any desired manner, as for instance by insertion under the conventional windshield inner garnish molding 33 that is secured in place by screws 34. The strip 30 includes a base portion 35 that lies on the shelf 9 and has an upstanding edge 36 from which extends a lip 37, the upstanding edge and the lip extending for the full length of the base portion. In order to facilitate flexing of the metal strip 30 to conform it with the lower edge of the windshield molding 33 the strip has a series of slots 38 formed through the base portion 35 thereof up to the edge 36 and another series of slots 39 out of alignment with slots 38, the slots 39 being formed in the lip 37 up to the edge 36. This forms series of tabs 40 and 41. The lower front edge of the reflecting visor 10 fits under the lip 37 and due to the resiliency of the reflecting visor and the fact that it is somewhat stressed it exerts a continuous pressure against the lip 37 which thereby holds the bottom of the inside reflecting visor against upward flexing and against vibration. The metal strip 30 is of a color such as to reflect a minimum amount of light, being preferably a dull black color.

When the strip 30 is inserted under the windshield inner garnish molding, one or more of the tabs 40 may be in the positions of the screws 34. Such tabs are easily removed by flexing them back and forth until they break off at their juncture with the upstanding edge 36.

In some automobiles the windshield is divided into two halves separated by a windshield center division bar. In such case one or more of the tabs 40 at the windshield center division bar are broken away to permit positioning of the strip 30.

In compliance with the requirements of the patent statutes we have here shown and described a few preferred embodiments of our invention. It is, however, to be understood that the invention is not limited to the precise construction here shown, the same being merely illustrative of the principles of the invention. What we consider new and desire to secure by Letters Patent is:

1. A reflector visor for mounting on the inside of an automobile in a position to extend inwardly and upwardly from adjacent the bottom of the front windshield to protect against light reflection from the top of the automobile instrument panel and parts adjacent thereto, said visor comprising a sheet of flexible material of greater width at its center than at its ends, means for mounting said sheet in a position extending across the automobile and inwardly and upwardly from the lower edge of the windshield, and a flexible holding strip adapted to be secured across the automobile and along the lower edge of the windshield, said flexible holding strip having a shoulder against which the lower edge of the flexible visor sheet bears to limit its movement in a direction forward of the automobile.

2. A reflector visor for mounting on the inside of an automobile in a position to extend inwardly and upwardly from adjacent the bottom of the front windshield to protect against light reflection from the top of the automobile instrument panel and parts adjacent thereto, said visor comprising a sheet of flexible material of greater width at its center than at its ends, means for mounting said sheet in a position extending across the automobile and inwardly and upwardly from the lower edge of the windshield, and a flexible holding strip adapted to be secured across the automobile and along the lower edge of the windshield, said flexible holding strip having a shoulder against which the lower edge of the flexible visor sheet bears to limit its movement in a direction forward of the automobile, and having means overlying the lower edge of the flexible visor sheet and holding said edge downward.

3. A reflector visor for mounting on the inside of an automobile in a position to extend inwardly and upwardly from adjacent the bottom of the front windshield to protect against light reflection from the top of the automobile instrument panel and parts adjacent thereto, said visor comprising a sheet of flexible material of greater width at its center than at its ends, means for mounting said sheet on the uprights at the right and left hand sides of the front of an automobile, said means comprising similar right and left brackets adapted to fit against the uprights and be held against turning and each having a slot for receiving a mounting screw, each slot being elongated to permit adjustment of the bracket lengthwise of the uprights, the two brackets having inwardly facing channels for receiving and holding the transverse ends of said visor sheet, the sheet being flexed into position in said channels and being held therein by its own resiliency, and a flexible holding strip adapted to be secured across the automobile and along the lower edge of the windshield and having means overlying the lower edge of the flexible visor sheet and holding said edge downward.

4. A reflector visor for mounting on the inside of an automobile in a position to extend inwardly and upwardly from adjacent the bottom of the front windshield to protect against light reflection from the top of the automobile instrument panel and parts adjacent thereto, said visor comprising a sheet of flexible material of greater width at its center than at its ends, means for mounting said sheet on the uprights at the right and left hand sides of the front of an automobile, said means comprising brackets adapted to fit against the uprights and be held against turning and each having a slot for receiving a mounting screw, each slot being elongated to permit adjustment of the bracket lengthwise of the uprights, the two brackets having inwardly facing channels for receiving and holding the transverse ends of said visor sheet, the sheet being flexed into position in said channels and being held therein by its own resiliency, and a flexible holding strip adapted to be secured across the automobile and along the lower edge of the windshield, said flexible holding strip having a shoulder against which the lower edge of the flexible visor sheet bears to limit its movement in a direction forward of the automobile and having means overlying the lower edge of the flexible visor sheet and holding said edge downward.

5. A reflector visor for mounting on the inside of an automobile in a position to extend inwardly and upwardly from adjacent the bottom of the front windshield to protect against light reflection from the top of the automobile instrument panel and parts adjacent thereto, said visor comprising a sheet of flexible material of greater width at its center than at its ends, means for mounting said sheet on the uprights at the right and left hand sides of the front of an automobile, said means comprising brackets adapted to fit against the uprights and be held against turning and each having a slot for receiving a mounting screw, each slot being elongated to permit adjustment of the bracket lengthwise of the uprights, and a flexible holding strip adapted to be secured across the automobile and along the lower edge of the windshield, said flexible holding strip having a shoulder against which the lower edge of the flexible visor sheet bears to limit its movement in a direction forward of the automobile and having means overlying the lower edge of the flexible visor sheet and holding said edge downward.

ROBERT J. CHONOSKI.
HORACE W. HACKER.

References Cited in the file of this patent

UNITED STATES PATENTS

| Number | Name | Date |
|---|---|---|
| 1,649,985 | Schweizer | Nov. 22, 1927 |
| 2,187,027 | Harvey | Jan. 16, 1940 |
| 2,318,143 | Cutting | May 4, 1943 |
| 2,460,760 | Mazza | Feb. 1, 1949 |
| 2,501,250 | Wilson | Mar. 21, 1950 |
| 2,556,950 | Walker | June 12, 1951 |